Oct. 5, 1948.  A. F. ROMMEL  2,450,563

ROASTER

Filed Jan. 12, 1946

INVENTOR.
A. F. ROMMEL
BY
Cook + Robinson
ATTORNEYS

UNITED STATES PATENT OFFICE 2,450,563

ROASTER

Anton F. Rommel, Tacoma, Wash.

Application January 12, 1946, Serial No. 640,812

2 Claims. (Cl. 219—19)

This invention relates to cooking or roasting utensils and it has reference more particularly to an electrically heated roaster of a type adapted to be conveniently used on the table, after the fashion of the usual electric toaster or waffle iron, and in which roaster such articles as ears of corn, potatoes, and the like, may be roasted or baked; it being the principal object of the present invention to provide an electric roaster of the above stated kind that is compact, convenient, and effective in its use, and also is attractive and desirable for its intended uses.

It is also an object of the invention to provide a device of the character stated, wherein corn on the cob, potatoes and similar articles may be quickly and evenly roasted, and without requiring that they be continuously or periodically turned in order to insure even and complete baking or roasting.

It is a further object of the invention to provide a device having a top or cover member that may be opened up to give easy and satisfactory access to the roaster for the placing of articles therein or for their removal.

Still further objects of this invention reside in the details of construction of the various parts; in the relationship of parts and mode of use of the device, as will hereinafter be fully described.

In accomplishing these and other objects of the invention, I have provided the improved details of construction, the preferred forms of which are illustrated in the accompanying drawings, wherein—

Referring more in detail to the drawings—

Figure 1:
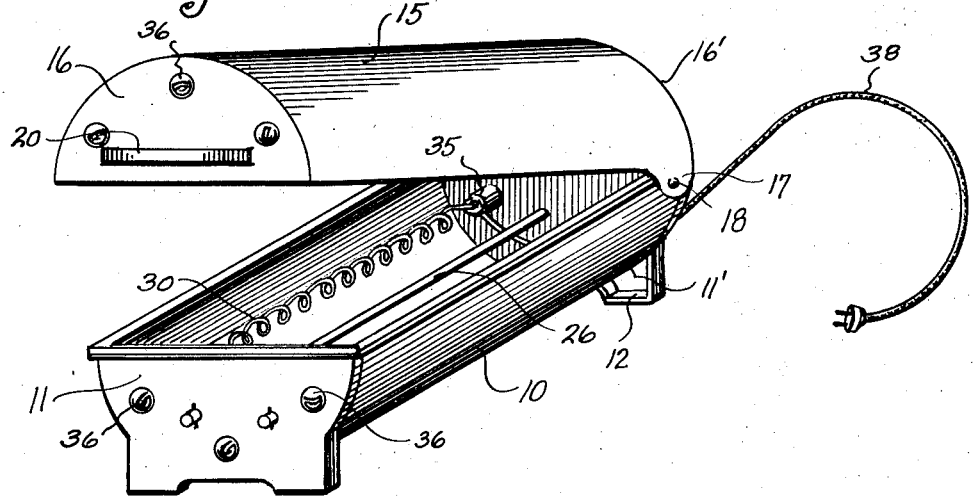
Fig. 1 is a perspective view of an electrically heated roasting utensil embodying the present invention; the cover member thereof being shown in a partly raised position for better disclosure of interiorly contained parts.
Figure 2:
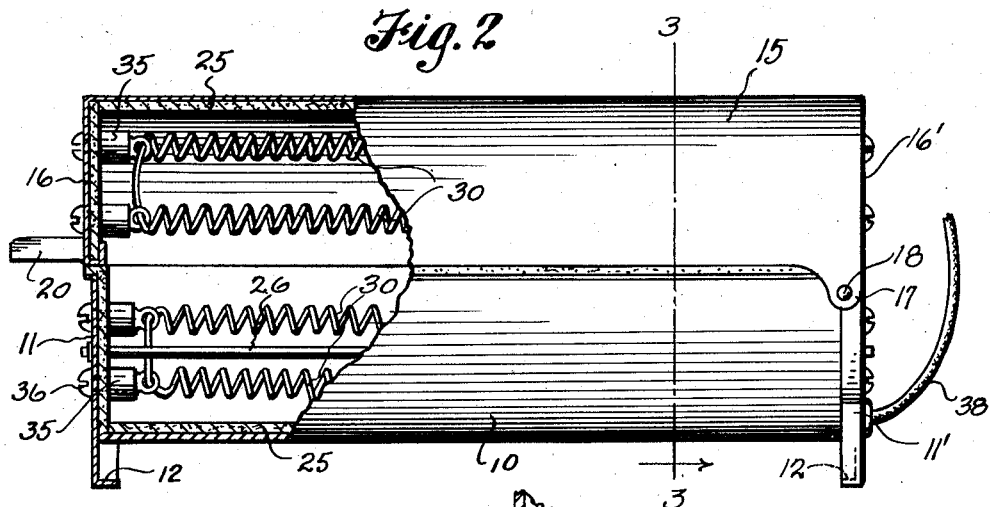
Fig. 2 is a side view of the device with parts broken away for better illustration.

The present roaster comprises an oven of cylindrical form, horizontally disposed and equipped for its convenient disposition and use upon the kitchen or dining table. In a preferred form of construction, the utensil comprises a base portion and a cover portion that is hinged thereto. The base portion comprises a semi-cylindrical housing 10 equipped at its opposite ends with supporting frames 11 and 11', which frames are in the form and serve as end closure plates for the part 10 and are fixedly secured thereto by any suitable means. As noted best by reference to Fig. 2, the frames 11 and 11' have horizontal bottom edges formed with inturned flanges 12 providing feet whereby the device is given substantial and firm support on a table surface and possible marring of the surface is thus prevented.

The cover portion of the device is designated in its entirety by numeral 15, and it is of semi-cylindrical form and substantially of the same size as the bottom or base portion 10, and is so assembled therewith that together they form a cylindrical oven. As noted best in Fig. 3, the cover portion directly overlies the bottom portion and their longitudinal and end edge surfaces engage one another in a closed joint. The upper part, or cover portion 15, has opposite end walls 16—16' fixed thereto, and at one end of the cover portion, and at opposite sides thereof, hinge ears 17—17 depend from the edges of the cover and are pivoted to the lower portion, as at 18 so that the cover may be lifted to a raised, open position.

On the forward end wall 16 of the cover portion, is a handle member 20 of a suitable material whereby the cover may be conveniently raised and lowered.

To retain heat in the oven and to prevent overheating of the metal housing, it is desirable that the oven be interiorly lined with suitable insulating material, such as asbestos, designated by numeral 25.

Figure 3:
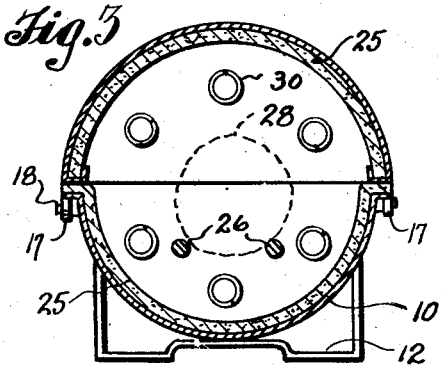
Fig. 3 is a cross section on line 3—3 in Fig. 2.
Figure 4:
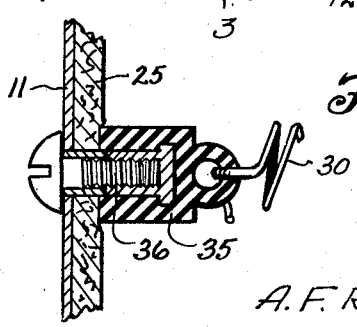
Fig. 4 is an enlarged sectional detail of one of the heating element mounting devices.

Arranged within the lower or base portion of the oven, are two supporting rods 26—26 that are disposed in the same horizontal plane, and parallel with and at equal distances from the axial center of the oven. The location of these rods is such that if an ear of corn of ordinary size is laid thereon lengthwise of the oven, it will substantially axially coincide with the oven axis. In Fig. 3, I have indicated, at 25, what may be an ear of corn or a potato, as supported on the pair of rods for roasting.

The heating elements herein employed comprise strips or coils 30 of resistance wire. These coils are arranged lengthwise of the oven, at equal radial distances from the center and at equal distances apart. In the present device, six of such heating elements have been found quite satisfactory but more or less might be desirable. The resistance elements are mounted at their ends in insulating mountings 35 held by screws 36 applied through the end walls and into the mountings. The elements are joined in series and at the hinge end of the roaster are connected with a typical extension cord 28 for connection in an electric circuit.

In use of the device, the elements will apply a uniform temperature to an article held on the rods and the article will be evenly and uniformly cooked. This device has proved to be especially effective for the roasting of corn and potatoes, but is not restricted thereto.

The feature of the invention resides in the provision, within a cylindrically shaped oven, of supports for holding an article such as an ear of corn, substantially at the center of the oven, and the disposition thereabout of the heating elements so that uniform roasting may be accomplished without requiring that the article be turned. Opening apart of the sections, permits the roasted article to be readily removed.

Such devices may be made in various sizes and of various materials without departing from the spirit of the invention.

Having thus described my invention, what I claim as new therein and desire to secure by Letters Patent is:

1. A roaster of the character described comprising a cylindrical, heat insulated housing with closure at its opposite ends and made up of upper and lower semi-cylindrical sections, hingedly joined at their ends to permit the upper section to be moved between closed and open positions, spaced rods extended between the end walls of the lower section for the support thereon of an article to be roasted substantially in the longitudinal center of the housing, a plurality of resistance elements extending lengthwise of the housing parallel with and at equally spaced intervals about the center line of the housing and spaced inwardly from the housing walls, and means supporting said resistance elements from the end walls of the housing and whereby the elements of the upper section will move therewith in its movements between open and closed positions.

2. A device as in claim 1 wherein the end closures for the lower section are formed with legs that provide supports for the housing.

ANTON F. ROMMEL.

REFERENCES CITED

The following references are of record in the file of this patent:

UNITED STATES PATENTS

| Number | Name | Date |
|---|---|---|
| 1,690,570 | Dalbey, Sr. | Nov. 6, 1928 |
| 1,910,682 | Dumas | May 23, 1933 |
| 1,981,578 | Baggiolini | Nov. 20, 1934 |
| 2,025,899 | Rhodes | Dec. 31, 1935 |
| 2,041,318 | Berger | May 19, 1936 |
| 2,305,056 | Austin | Dec. 15, 1942 |